(12) United States Patent
Sanford et al.

(10) Patent No.: US 8,230,682 B1
(45) Date of Patent: Jul. 31, 2012

(54) THERMALLY ACTIVATED INITIATOR ASSEMBLY

(75) Inventors: Matthew J. Sanford, Bel Alton, MD (US); Victoria L. Beam, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 540 days.

(21) Appl. No.: 12/587,315

(22) Filed: Sep. 24, 2009

(51) Int. Cl.
*F01B 29/10* (2006.01)
*F02G 1/04* (2006.01)
*H01H 71/20* (2006.01)

(52) U.S. Cl. .............................. 60/527; 337/147; 60/529

(58) Field of Classification Search ............ 60/527–529; 337/142–148; 42/69.01–69.03
See application file for complete search history.

(56) References Cited

U.S. PATENT DOCUMENTS

| | | | |
|---|---|---|---|
| 4,663,682 A * | 5/1987 | McNeil | 360/255.6 |
| 5,237,472 A * | 8/1993 | Morehouse et al. | 360/254.8 |
| 5,685,148 A | 11/1997 | Robert | |
| 5,816,306 A | 10/1998 | Giacomel | |
| 5,975,468 A | 11/1999 | Moignier et al. | |
| 6,321,656 B1 | 11/2001 | Johnson | |
| 6,549,377 B2 * | 4/2003 | Yoshida et al. | 360/254.3 |
| 6,851,260 B2 | 2/2005 | Mernoe | |
| 7,021,055 B2 | 4/2006 | Gummin et al. | |
| 7,051,511 B2 | 5/2006 | Prytz | |
| 7,085,106 B2 | 8/2006 | Hong et al. | |
| 2004/0261412 A1 * | 12/2004 | Hickey | 60/527 |

* cited by examiner

*Primary Examiner* — Allana Lewin
*Assistant Examiner* — Brian Inacay
(74) *Attorney, Agent, or Firm* — Fredric J. Zimmerman

(57) ABSTRACT

A thermally activated initiator assembly uses a first bar that experiences a change in length as a function of temperature. The first bar is coupled to a first support. A second support is pivotally coupled to the first support and to the first bar so that the second support may move relative to the first support when the first bar experiences the change in length. An initiator is coupled to the second support adjacent to the high side of a ramp on the second support. A second bar is rigidly coupled to the first support. The second bar rests on the low side of the ramp prior to the first bar experiencing the change in length. When the first bar experiences the change in length, the second support moves relative to the first support causing the second bar to slide along the ramp until it falls off the ramp's high side to strike the initiator.

18 Claims, 1 Drawing Sheet

THERMALLY ACTIVATED INITIATOR ASSEMBLY

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to ignition initiators, and more particularly to an ignition initiator assembly that uses a thermally activated material as the assembly's actuator.

BACKGROUND OF THE INVENTION

Ideally, rocket propellant is ignited to burn at a controlled rate to provide propulsion. If rocket propellant gets hot (e.g., in the event of a fire), a catastrophic detonation or explosion can occur since the burn rate of rocket propellant increases when it is hot. To prevent this from occurring, rocket motors can incorporate some type of propellant venting system that allows pressure from burning propellant to be released from a rocket motor's case before catastrophic failure of the motor case. Unfortunately a venting system by itself may not provide enough protection when the rocket motor is long (i.e., insufficient venting for pressure release) or when certain propellants are used (i.e., propellants with low-auto-ignition temperature). In these cases, one or more simple propellant ignition/initiation devices could help ignite the propellant before it reaches its detonation/explosion temperature for a controlled propellant burn at the same time the propellant venting system was releasing pressure in the rocket motor case.

SUMMARY OF THE INVENTION

Accordingly, it is an object of the present invention to provide a simple ignition/initiation device that is activated at a pre-determined temperature.

Other objects and advantages of the present invention will become more obvious hereinafter in the specification and drawings.

In accordance with the present invention, a thermally activated initiator assembly is provided. A first bar that experiences a change in length as a function of temperature is coupled at one point thereof to a first support. A second support is pivotally coupled to the first support and to the first bar so that the second support can move relative to the first support when the first bar experiences the change in length. A ramp is coupled to the second support. An initiator is coupled to the second support adjacent to the high side of the ramp. A second bar is rigidly coupled at one point thereof to the first support. The second bar rests at another point thereof on the low side of the ramp prior to the first bar experiencing the change in length. When the first bar experiences the change in length such that the second support moves relative to the first support, the second bar slides along the ramp and falls off the high side thereof to strike the initiator.

BRIEF DESCRIPTION OF THE DRAWINGS

Other objects, features and advantages of the present invention will become apparent upon reference to the following description of the exemplary embodiments and to the drawings, wherein corresponding reference characters indicate corresponding parts throughout the several views of the drawings and wherein.

DETAILED DESCRIPTION OF THE INVENTION

Figure 1:
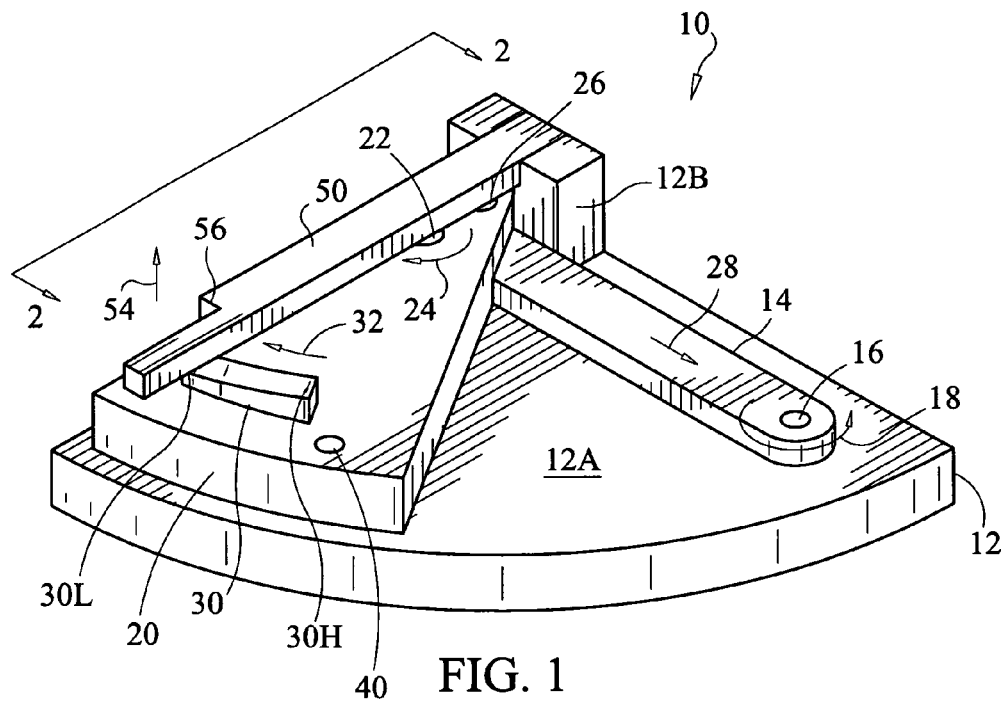
FIG. 1 is a perspective view of an embodiment of a thermally activated initiator assembly in its non-activated position in accordance with the present invention.
Figure 2:
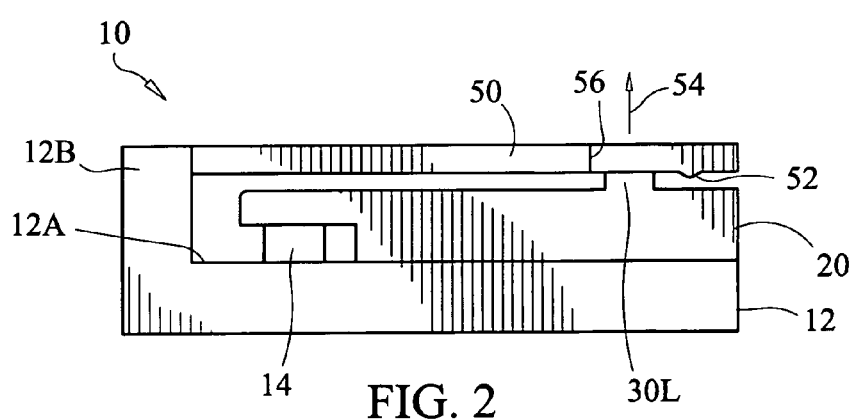
FIG. 2 is a side view of the thermally activated initiator assembly taken along line 2-2 in FIG. 1.

Referring now to the drawings, simultaneous reference will be made to FIGS. 1 and 2 where an exemplary embodiment of a thermally activated initiator assembly 10 makes it suitable for use in rocket motors as the means to ignite rocket propellant before the propellant reaches its detonation/explosion temperature. However, initiator assembly 10 is not limited to use in rocket motors as it may be used in any application requiring automatic ignition/initiation when a predetermined thermal condition occurs.

Initiator assembly 10 includes a base 12 that serves as the support for the remaining components of assembly 10. Base 12 (as well as the remaining components of assembly 10) is made from material(s) that can withstand the operating environment in which assembly 10 will be installed. In the illustrated embodiment, base 12 defines a planar surface 12A and a support post 12B extending up from surface 12A. Post 12B can be attached to or integral with surface 12A without departing from the scope of the present invention. For reasons that will become more apparent from the ensuing description, surface 12A can be made from (or coated with) an anti-friction material to facilitate the sliding of other components thereon.

A bar 14 rests on surface 12A and is coupled to base 12 at a hinge or pivot point 16 so that bar 14 may pivot around point 16 on surface 12A as indicated by rotation arrow 18. Bar 14 is shaped such that its dominant dimension is its length. Bar 14 may be rectangular in cross-section (as shown), but could also have other cross-sectional geometries (e.g., circular, oval, triangular, octagonal, etc.) without departing from the scope of the present invention.

In general, bar 14 is made from a material or materials that cause bar 14 to undergo a change in length (e.g., increase or decrease in length) in the presence of a temperature change (e.g., increase or decrease) of interest. For example, in the case where initiator assembly 10 is to be used to ignite rocket propellant before it reaches its detonation/explosion temperature, bar 14 is configured to undergo a change in its length at a temperature that is less than the propellant's detonation/explosion temperature. The actual amount of change in length is predetermined and designed to bring about the necessary amount of movement of the remaining components of assembly 10 as will be described further below. By way of example, bar 14 may be made from commercially-available shape memory alloys (e.g., nickel-titanium, which is also referred to as Nitinol® as is known in the art) that shrink when exposed to an elevated temperature. An advantageous attribute of nickel-titanium is that it provides a fast response once the elevated temperature of interest is attained.

Initiator assembly 10 also includes a movable member 20 that rests on surface 12A and is coupled to base 12 at a hinge or pivot point 22 so that member 20 may pivot around point 22 on surface 12A as indicated by rotation arrow 24. Member 20 is also pivotally coupled to bar 14 at a hinge or pivot point 26 that bar 14 and member 20 can experience relative movement on surface 12A when bar 14 undergoes a change in length L.

That is, member 20 moves or pivots about point 22 when bar 14 undergoes a change in length L (e.g., shrinkage as indicated by a direction-of-length-change arrow 28 superimposed on bar 14).

Mounted atop or integral with movable member 20 is an inclined ramp 30. The length and amount of incline of ramp 30 are design choices that do not limit the scope of the present invention. In general, ramp 30 has a low side 30L and a high side 30H that defines an abrupt end to ramp 30. Mounted on or embedded in (as shown) movable member 20 is an initiator 40. In general, initiator 40 is any percussion-activated ignition/initiation material capable of producing a required explosion, flame, shock wave, gas, etc., when impacted with a sufficient force. Initiator 40 is positioned adjacent to the high side 30H of ramp 30.

A strike bar 50 is fixedly attached to support post 12B such that strike bar 50 extends over movable member 20 and rests on the low side 30L of ramp 30 when bar 14 is in its neutral or non-activated state. The underside of strike bar 50 that opposes movable member 20 can include/integrate a protuberance 52 that is radially aligned with initiator 40 relative to pivot point 22. That is, the radial distance from pivot point 22 along strike bar 50 to protuberance 52 is equal to the radial distance from pivot point 22 to initiator 40. Generally, strike bar 50 is a relatively rigid bar whose length remains constant throughout the temperature change, which causes bar 14 to change in length. However strike bar 50 is capable of experiencing out-of-plane deflection as indicated by arrow 54. Strike bar 50 may be notched (as indicated by numeral 56) at the end thereof that extends over ramp 30. The purpose of notch 56 will be explained further below.

In terms of the exemplary embodiment's operation, initiator assembly 10 is configured as illustrated in the figures with strike bar 50 and initiator 40 being out of radial alignment with one another as strike bar 50 rests on low side 30L of ramp 30. When bar 14 experiences a temperature increase that causes bar 14 to shrink in length as indicated by arrow 28, member 20 will start to rotate about pivot 22 as indicated by arrow 24. The rotational sliding of member 20 on surface 12A causes ramp 30 to similarly rotate as indicated by arrow 32 thereby effectively making strike bar 50 slide along ramp 30 and experience out-of-place deflection indicated by arrow 54. As strike bar 50 deflects out-of-plane, potential spring energy is stored in strike bar 50. Bar 14 is designed to shrink in length by a predetermined amount commensurate with an elevated target temperature at which member 20 rotates the high side 30H of ramp 30 past the start of notch 56 formed in strike bar 50. When this happens, strike bar 50 snaps down toward surface 12A as the potential spring energy stored in strike bar 50 is released. In this position, protuberance 52 is radially aligned with initiator 40 so that the snap action of strike bar 50 causes protuberance 52 to strike and initiate activation of initiator 40. The provision of notch 56 ensures that strike bar 50 does not twist as it begins to slide off the high side 30H of ramp 30.

The advantages of the present invention are numerous. The assembly may be made in a variety of sizes and configurations so that it is readily adapted to a variety of large or small installations/applications to include, for example, the end cap of a rocket motor. Mechanical lever geometry is used to amplify the relatively small shrinkage of the thermally activated bar to move the strike bar from an out-of-line position to an in-line position. The mechanical lever makes use of the very high forces developed by the thermally activated bar upon heating. The energy from the shrinking bar cocks and causes the release of the striker bar so that the assembly does not require or rely on any energy storage device. The thermally activated bar essentially acts as a lock to keep the striker bar and initiator out-of-line with respect to one another to prevent initiation from shock or subversive actions. The components are rugged and do not require complex geometry or extremely tight tolerances thereby making the overall assembly inexpensive and east to manufacture. The assembly is all mechanical and does not require batteries or other sensitive electronic components.

Although the invention has been described relative to a specific exemplary embodiment thereof, there are numerous variations and modifications that will be readily apparent to those skilled in the art in light of the above teachings. For example, changes may be made to the length, orientation, and location of the pivot points to get more or less motion. The ramp angle could be made more or less steep to store more or less energy as desired for impacting the initiator. A variety of materials may be used without departing from the scope of the present invention. The thickness of the striker bar may be increased or decreased to store more or less energy as desired for impacting the initiator. The assembly may be made large or small to fit the particular application. The thermally activated bar may be selected and/or modified to allow it to change length at a desired temperature. More than one initiator may be used for redundancy. It is therefore to be understood that, within the scope of the appended claims, the invention may be practiced other than as specifically described.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed as new and desired to be secured by Letters Patent of the United States is:

1. A thermally activated initiator assembly, comprising:
    a first support;
    a first bar experiencing a change in length as a function of temperature, said first bar coupled at one point thereof to said first support;
    a second support being pivotally coupled to said first support and to said first bar, wherein said second support moves relative to said first support when said first bar experiences said change in length;
    a ramp being coupled to said second support, said ramp includes a low side and a high side;
    an initiator being coupled to said second support adjacent to said high side of said ramp; and
    a second bar being rigidly coupled at one point thereof to said first support, said second bar rests at another point thereof on said low side of said ramp prior to said first bar experiencing said change in length,
    wherein, when said first bar experiences said change in length to cause said second support to move relative to said first support, said second bar slides along said ramp and falls off said high side thereof to strike said initiator.

2. The thermally activated initiator assembly as in claim 1, wherein said first bar comprises a material that shrinks as a function of increasing temperature.

3. The thermally activated initiator assembly as in claim 1, wherein said first bar is pivotally coupled to said first support.

4. The thermally activated initiator assembly as in claim 1, wherein said second bar comprises a material that experiences out-of-plane deflection when said second bar slides along said ramp, said out-of-plane deflection serves as a source of potential energy released when said second bar falls off said high side of said ramp.

5. The thermally activated initiator assembly as in claim 1, wherein said second bar includes a protrusion to strike said initiator when said second bar falls off said high side of said ramp.

6. The thermally activated initiator assembly as in claim 1, wherein said first bar comprises a shape memory alloy.

7. A thermally activated initiator assembly, comprising:
   a base including a planar surface region;
   a bar experiencing a change in length as a function of temperature, said bar coupled at one point thereof to said base with said bar resting on said planar surface region;
   a sliding member being pivotally coupled to said base and to said bar, said sliding member includes a flat surface resting on said planar surface region of said base,
      wherein said sliding member pivots relative to said base and slides on said planar surface region when said bar experiences said change in length;
   a ramp being coupled to said sliding member, said ramp includes a low side and a high side;
   an initiator being coupled to said sliding member adjacent to said high side of said ramp; and
   a striker bar being rigidly coupled at one point thereof to said base, said striker bar extends over said sliding member, and said striker bar rests at another point thereof on said low side of said ramp prior to said bar experiencing said change in temperature,
      wherein, when said bar experiences said change in length to cause said sliding member to pivot relative to said base and slide on said planar surface region, said striker bar slides along said ramp and falls off said high side thereof to strike said initiator.

8. The thermally activated initiator assembly as in claim 7, wherein said bar comprises a material that shrinks as a function of increasing temperature.

9. The thermally activated initiator assembly as in claim 7, wherein said bar is pivotally coupled to said base.

10. The thermally activated initiator assembly as in claim 7, wherein said striker bar comprises a material that experiences out-of-plane deflection when said striker bar moves up said ramp, said out-of-plane deflection serves as a source of potential energy released when said striker bar falls off said high side of said ramp.

11. The thermally activated initiator assembly as in claim 7, wherein said striker bar includes a protrusion for striking said initiator when said striker bar falls off said high side of said ramp.

12. The thermally activated initiator assembly as in claim 7, wherein said bar comprises a shape memory alloy.

13. The thermally activated initiator assembly as in claim 7, wherein said initiator is embedded in said sliding member.

14. A thermally activated initiator assembly, comprising:
   a first support;
   a bar experiencing a change in length as a function of temperature, said bar pivotally coupled at one point thereof to said first support;
   a second support being pivotally coupled to said first support and to said bar, wherein said second support pivotally moves relative to said first support when said bar experiences said change in length;
   a ramp being coupled to said second support, said ramp includes a low side and a high side;
   an initiator being coupled to said second support adjacent to said high side of said ramp; and
   a substantially rigid striker bar being rigidly coupled at one point thereof to said first support, said striker bar rests at another point thereof on said low side of said ramp prior to said bar experiencing said change in length,
      wherein, when said bar experiences said change in length to cause said second support to pivotally move relative to said first support, said striker bar slides along said ramp and deflects out-of-plane to store potential energy released when said striker bar falls off said high side thereof to strike said initiator with force.

15. The thermally activated initiator assembly as in claim 14, wherein said bar comprises a material that shrinks as a function of increasing temperature.

16. The thermally activated initiator assembly as in claim 14, wherein said striker bar includes a protrusion for striking said initiator when said striker bar falls off said high side of said ramp.

17. The thermally activated initiator assembly as in claim 14, wherein said bar comprises a shape memory alloy.

18. The thermally activated initiator assembly as in claim 14, wherein said initiator is embedded in said second support.

* * * * *